(12) United States Patent
Mangu et al.

(10) Patent No.: US 11,682,146 B2
(45) Date of Patent: Jun. 20, 2023

(54) VECTOR OBJECT PATH SEGMENT EDITING

(71) Applicant: Adobe Inc., San Jose, CA (US)

(72) Inventors: Shashidhar Mangu, Ghatkesar (IN); Tudor Muscalu, Bucharest (RO); Priyanka Channabasappa Herur, Bengaluru (IN); Piyush Vashisht, Banger (IN); Mrinalini Sardar, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/522,371

(22) Filed: Nov. 9, 2021

(65) Prior Publication Data

US 2023/0144858 A1 May 11, 2023

(51) Int. Cl.
*G06T 11/20* (2006.01)
*G06T 3/40* (2006.01)
*G06T 11/60* (2006.01)

(52) U.S. Cl.
CPC .............. *G06T 11/203* (2013.01); *G06T 3/40* (2013.01); *G06T 11/60* (2013.01); *G06T 2200/24* (2013.01)

(58) Field of Classification Search
CPC ......... G06T 11/203; G06T 3/40; G06T 11/60; G06T 2200/24
See application file for complete search history.

(56) References Cited

U.S. PATENT DOCUMENTS

2006/0094951 A1* 5/2006 Dean ...................... G06T 17/10
600/407
2013/0278594 A1* 10/2013 Kaatz ................... G06T 11/203
345/611

* cited by examiner

*Primary Examiner* — Samantha (Yuehan) Wang
(74) *Attorney, Agent, or Firm* — FIG. 1 Patents

(57) ABSTRACT

Vector object path segment editing techniques are described that retain edibility of a path while supporting editing of a segment included within the path, individually and separately, without editing other segments of path. A vector object editing module first retrieves information on segments included in a path of a vector object. The vector object editing module then renders a selected segment separately from an adjacent segment based on the selected segment model. An editing operation is then applied to the selected segment as specified via the user interface, e.g., to change color, width, or other display characteristic. The vector object editing module then generates a joint between the edited segment and the adjacent segment to provide a transition between the segments that mimics inclusion as a single path that contains those segments.

20 Claims, 9 Drawing Sheets

VECTOR OBJECT PATH SEGMENT EDITING

BACKGROUND

Vector objects are used to create a wide range of digital content due to the flexibility and accuracy in portraying the objects when rendered for display by a display device. Vector objects are mathematically generated using paths. This enables vector objects to be scaled and modified by a computing device without a loss in visual quality. The paths are typically defined using anchor points that define a start and end of the segments, e.g., as Bezier curves. The anchor points of the segments are linked together, one to another, to form the path as a visually continuous structure. As such, vector objects are employed for a variety of purposes, including logos, vector art, fonts, and so on.

Conventional techniques used to define the segments as a continuous path, however, do not support edits to individual segments of the path without "breaking" the path. In order to change a visual characteristic such as width, color, and so on, this change is made in conventional techniques to the path as a whole. As described above, this is because in conventional techniques visual continuity between the segments of the path is used to ensure visual continuity between adjacent segments. However, "breaking" the path in conventional techniques also breaks this defined continuity between the segments as part of the path. Consequently, this results in visual artifacts (e.g., a joint of two segments is not renderable in a manner as if those two were part of a continuous path), a loss of the underlying mathematical structure of the path as a continuous segment (e.g., for resizing and repositioning), and so forth. As such, conventional techniques used to edit a vector object lose the underlying functionality provided by mathematical definition of the object, and thus are frustrating, lack accuracy, and fail for their intended purpose.

SUMMARY

Vector object path segment editing techniques are described that retain edibility of a path while supporting editing of a segment included within the path, individually and separately, without editing other segments of path. In an example, a vector object editing module first retrieves information on segments included in a path of a vector object. The segments are ordered as following a sequence as included within the path, one to another, to form a path segment model. The vector object editing module then determines which segment is selected via a user input for editing.

The vector object editing module renders the selected segment separately from an adjacent segment based on the model. An editing operation is applied to the selected segment as specified via the user interface, e.g., to change color, width, or other display characteristic. The vector object editing module then generates a joint between the edited segment and the adjacent segment to provide a transition between the segments that mimics inclusion as a single path that contains those segments. The path of the vector object is rendered for display in a user interface as including the edited segment, the adjacent segment, and the joint.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
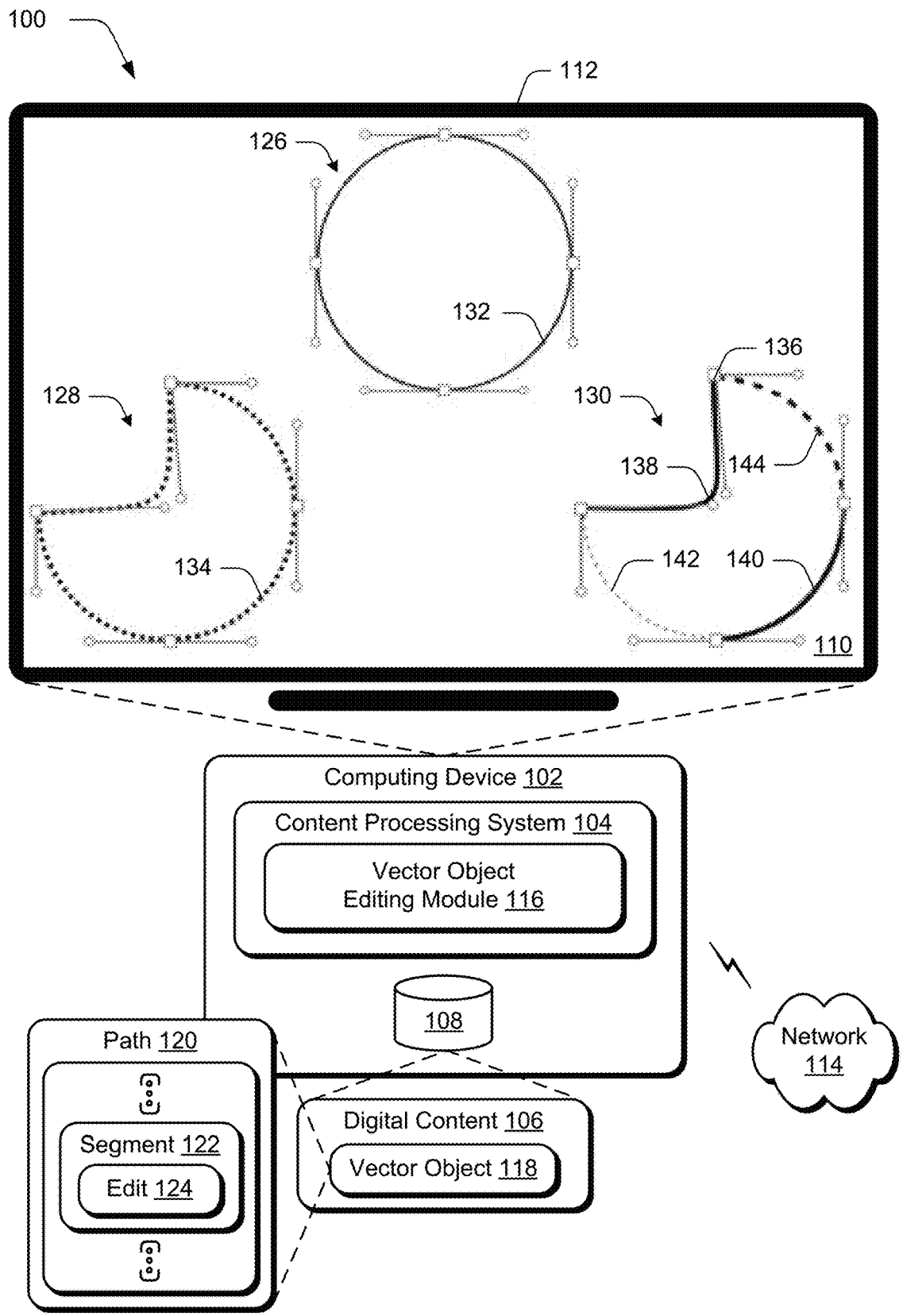
FIG. 1 is an illustration of an environment in an example implementation that is operable to employ techniques described herein.

Conventional techniques do not support editing of segments, individually, within a path of a vector object. Rather, any change in visual properties such as color, style, stroke width, and so forth are applied to an entirety of the path. Therefore, conventional techniques rely on "breaking" the path, which causes the path to lose its underlying continuous mathematical structure and corresponding functionality made possible by this structure. As such, conventional techniques involve a destructive process in which editability is lost, forcing retention of multiplicate duplicates to retain structure, and thus result in inefficient use of computational resources.

Accordingly, vector object path segment editing techniques are described that retain edibility of a path while supporting separate editing of segments included within the path. As a result, the techniques described herein support an ability to create and edit individual segments in a path, e.g., a Bezier stroke path. Examples of editing including changes to visual properties of the segments, such as contrast, line type, stroke width, color, and so on. These edits are supported while maintaining a mathematical definition of the path, e.g., as a path of Bezier curves included as part of a vector object.

In one example, a vector object editing module first retrieves information on segments included in a path of a vector object. The segments are ordered as following a sequence as included within the path, one to another, to form a path segment model. The vector object editing module then determines which segment is selected via a user input for editing, e.g., based on proximity of the segments to a selection point (e.g., via a cursor, gesture) in a user interface, a zoom value, a threshold value, and so on. The selected segment is used by the vector object editing module to generate a selected segment model as a linked list in which the selected segment is set as a root and other segments adjacent to the select segment of the path segment model are set in a hierarchical structure as "children" successively from the root segment.

The vector object editing module renders the selected segment separately from an adjacent segment based on the selected segment model. This rendering, for instance, includes adding a new anchor point superimposing the pre-existing one so that both the selected segment as well as the adjacent segment have their own individual anchor points.

An editing operation is then applied to the selected segment as specified via the user interface, e.g., to change color, width, or other display characteristic. This also includes changes to a location of the segment, e.g., by changing a location of an anchor point of a Bezier curve that implements the segment thereby altering a length of the segment. In this way, rendering of the selected segment separately supports edits to that segment without propagating the edits to the adjacent segment.

However, separate rendering of the edited segment and the adjacent segment is performed differently than if the segments were rendered together as a single path, e.g., due to lack of continuity between the segments caused by the separate overlapping anchor points. This causes a gap to be formed between the segments, even though anchor points of the respective segments overlap.

Accordingly, the vector object editing module is configured to generate a joint between the edited segment and the adjacent segment to provide a transition between the segments that mimics inclusion as a single path that contains those segments. To do so, a first portion is generated for the joint having a style based on the edited segment and a second portion is generated for the joint having a style based on the adjacent segment. In instances in which the editing operation involves movement of overlapping anchor points (e.g., which are used to perform the separate rendering), the adjacent segment from the selected path model is identified and re-rendered to propagate an effect of the change in location to the adjacent segment, and more particularly an anchor point of the adjacent segment. This is then used as a basis to generate the joint.

The path of the vector object is then rendered for display in a user interface as including the edited segment, the adjacent segment, and the joint. In this way, the path supports visual continuity as a single continuous path yet supports editing of segments individually within the path. Further discussion of these and other examples is included in the following sections and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ vector object path segment editing techniques described herein. The illustrated environment 100 includes a computing device 102, which is configurable in a variety of ways.

The computing device 102, for instance, is configurable as a desktop computer, a laptop computer, a mobile device (e.g., assuming a handheld configuration such as a tablet or mobile phone), and so forth. Thus, the computing device 102 ranges from full resource devices with substantial memory and processor resources (e.g., personal computers, game consoles) to a low-resource device with limited memory and/or processing resources (e.g., IoT devices). Additionally, although a single computing device 102 is shown, the computing device 102 is also representative of a plurality of different devices, such as multiple servers utilized by a business to perform operations "over the cloud" as described in FIG. 9.

The computing device 102 is illustrated as including a content processing system 104. The content processing system 104 is implemented at least partially in hardware of the computing device 102 to process and transform digital content 106, which is illustrated as maintained in storage 108 of the computing device 102. Such processing includes creation of the digital content 106, modification of the digital content 106, and rendering of the digital content 106 in a user interface 110 for output, e.g., by a display device 112. Although illustrated as implemented locally at the computing device 102, functionality of the content processing system 104 is also configurable as whole or part via functionality available via the network 114, such as part of a web service or "in the cloud." Digital content 106 is configurable in a variety of ways, examples of which include digital images, webpages, digital documents, user interfaces, digital media, digital movies, and any other type of content that is configured for rendering and display in the user interface 110.

An example of functionality incorporated by the content processing system 104 to process the digital content 106 is illustrated as a vector object editing module 116 that is configured to edit a vector object 118. The vector object 118 is includes a path 120 defined as points on a plane that are connected using segments 122, e.g., Bezier curves. Examples of Bezier curves include linear Bezier curves, Quadratic Bezier curves, and Cubic Bezier curves that have a corresponding number of control points. Control points include end points used to define a start and termination of the segment as well as other control points used to control curvature between the end points. Because of this, the vector object 118 supports scaling to different resolutions without aliasing and thus remain "crisp" and "sharp" when displayed. The path is a combination of linked segments 122 that are configured to support continuity in transition between adjacent segments 122.

The vector object editing module 116 is configured to support edits 124 to individual segments 122 within the path 120 without affecting other segments and breaking the path 120, which is not possible in conventional techniques. Consider an example of first, second, and third vector objects 126, 128, 130 as rendered for display in the user interface 110. Conventionally, an edit to path 132 in the first vector object 126 is applied entirely to each segment of the path 134, as shown for the second vector object 128. This example includes an edit to a visual appearance, e.g., from a continuous to a dashed line.

The third vector object 130, on the other hand, includes a path 136 formed from first, second, third, and fourth segments 138, 140, 142, 144 that are edited to support different visual characteristics, yet still form the path 136. The first and second segments 138, 140, for instance, include a larger line weight, a third segment 142 include a smaller line weight that is dashed, and the fourth segment 144 includes a larger line weight that is also dashed when compared to the first vector object 126. As a result, the vector object editing module 116 is configured to support edits 124 to individual segments 122 of the path 120 in a nondestructive manner that preserves the underlying mathematical definition of the vector object 118 and improves operation of the underlying computing device 102, e.g., by avoiding duplicate copies as required in conventional techniques as described above. Further discussion of this and other examples is included in the following section and shown using corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Vector Object Path Segment Editing

Figure 2:
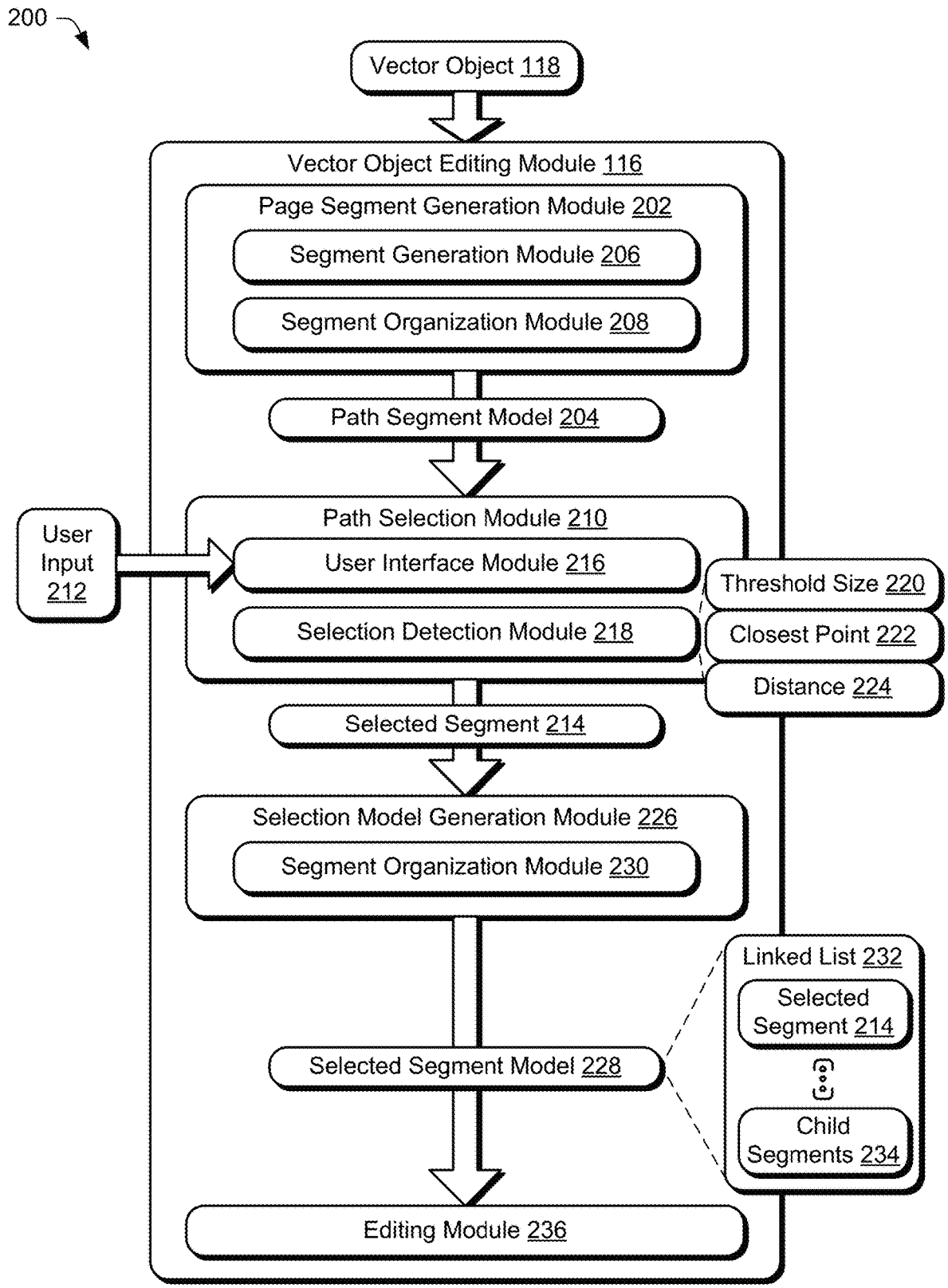
FIG. 2 depicts a system in an example implementation showing operation of a vector object editing module of FIG. 1 in greater detail as generating a selected segment model.
Figure 3:
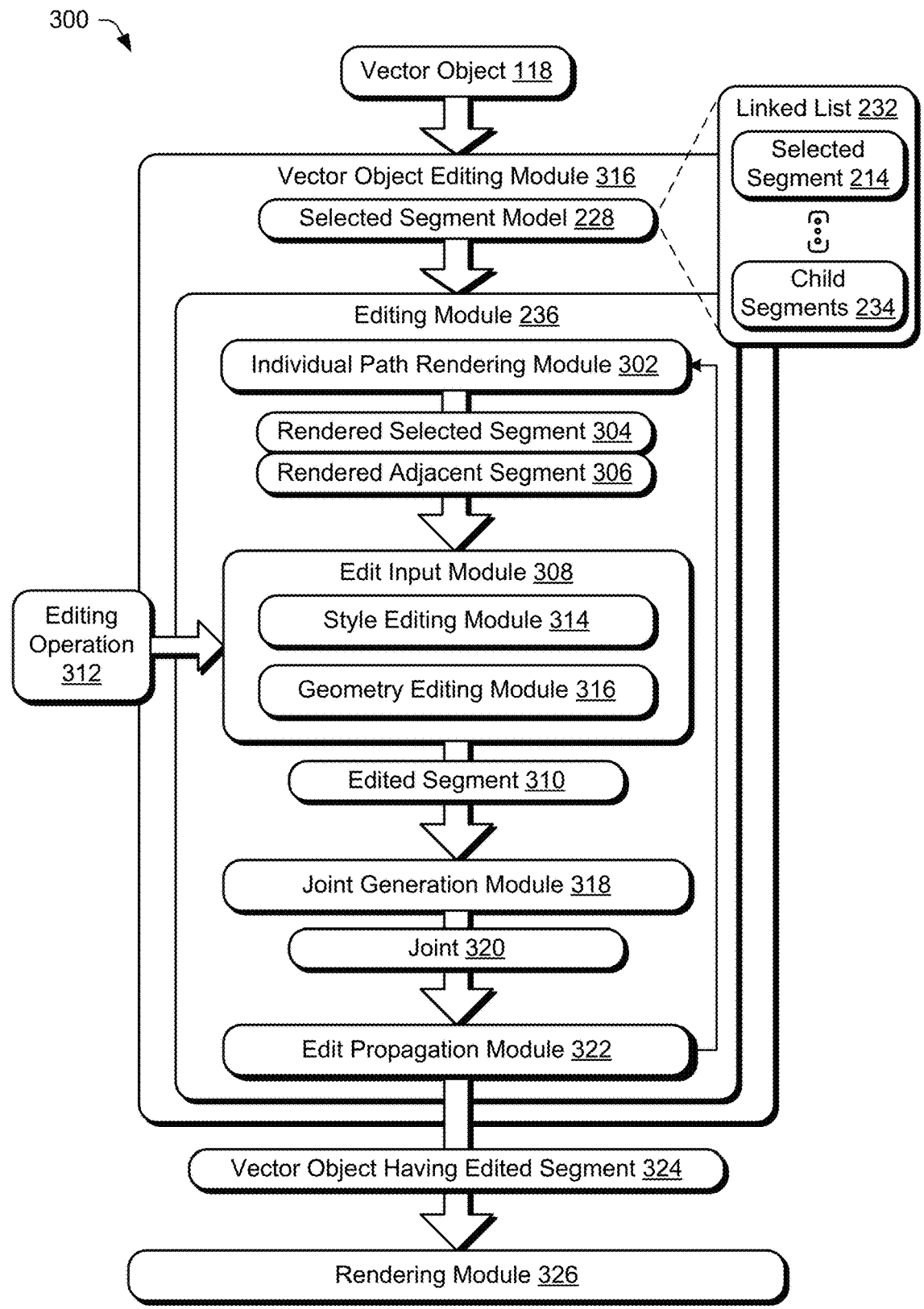
FIG. 3 depicts a system in an example implementation showing operation of the vector object editing module of FIG. 1 in greater detail as editing a segment and generating a joint of a vector object.
Figure 4:
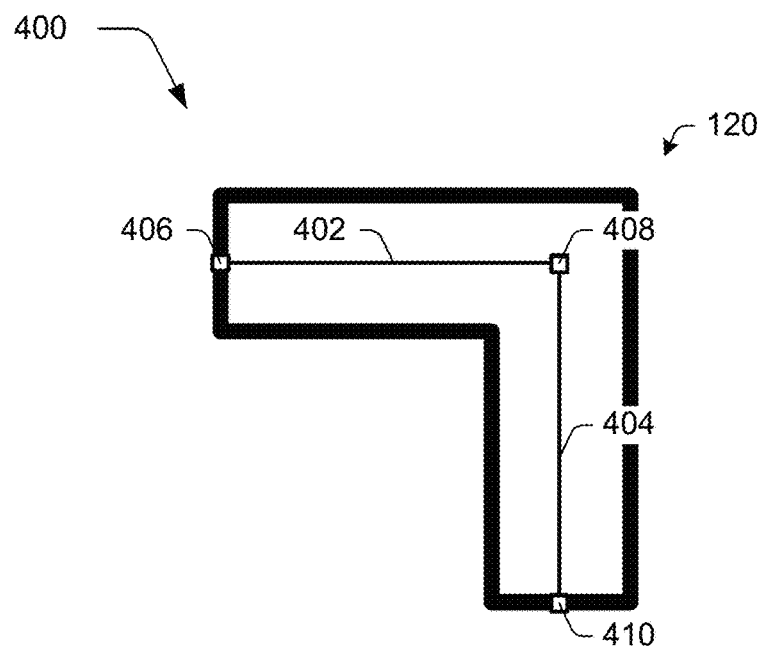
FIG. 4 depicts an example of a path of a vector object having a plurality of segments.
Figure 5:
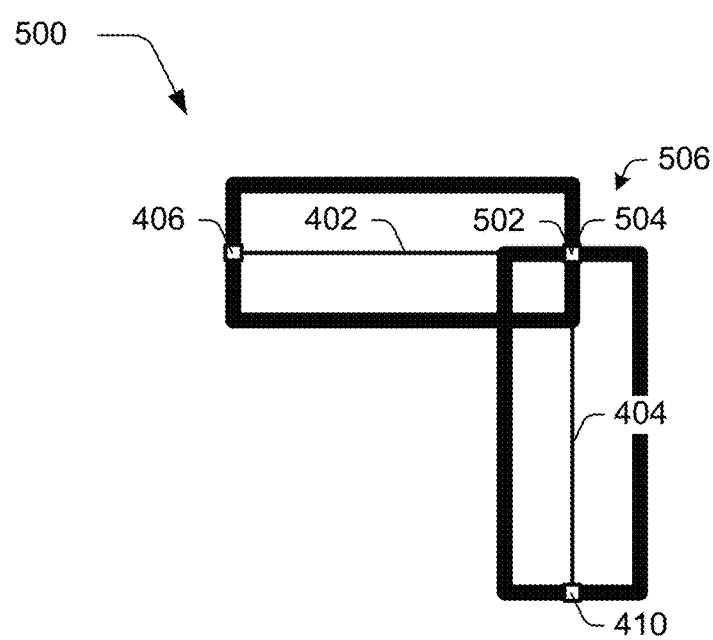
FIG. 5 depicts an example of separate rendering of the paths of the vector object of FIG. 4.
Figure 6:
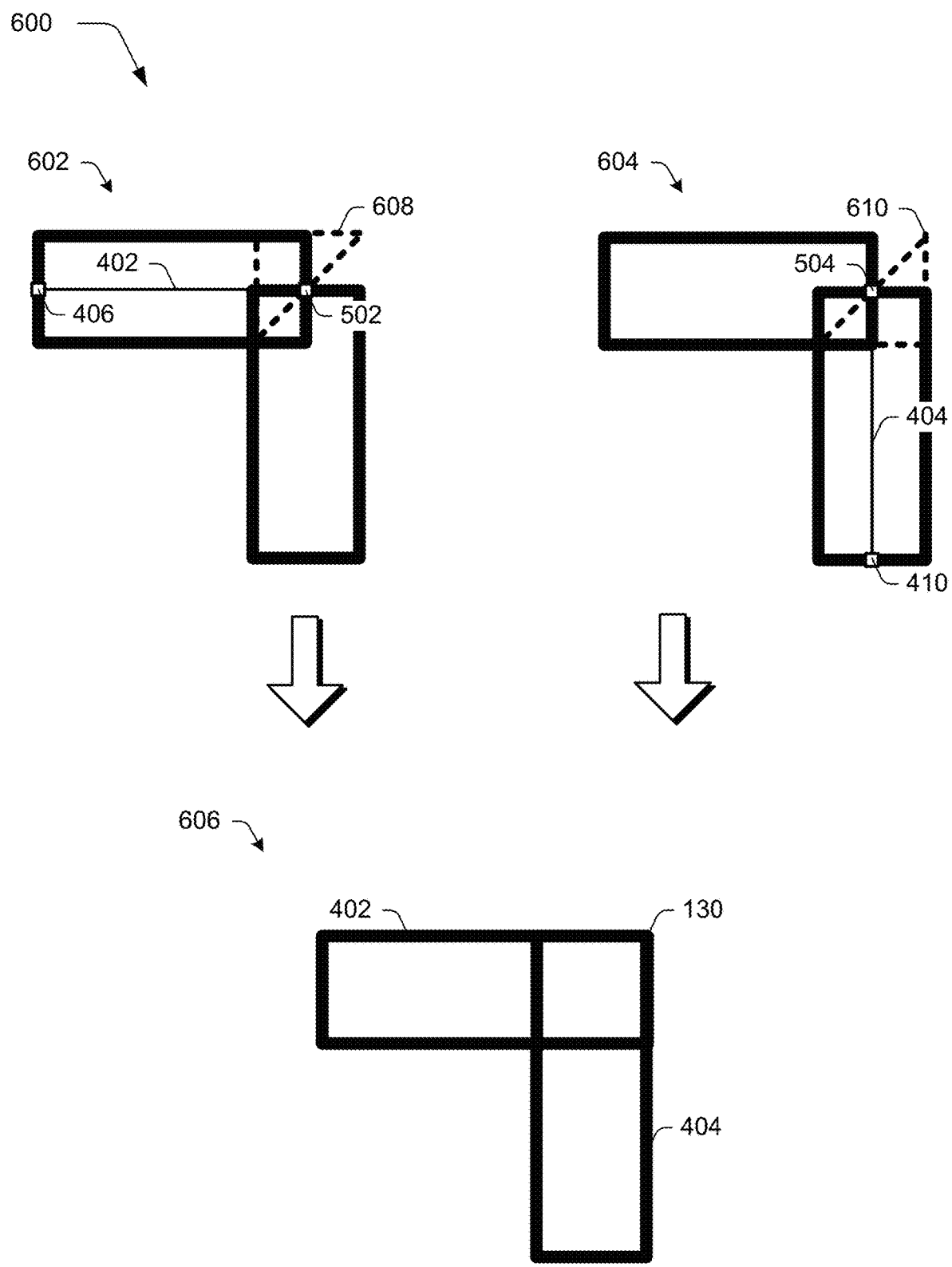
FIG. 6 depicts an example of generation of a joint to visually link the individually rendered paths of FIG. 5.
Figure 7A:
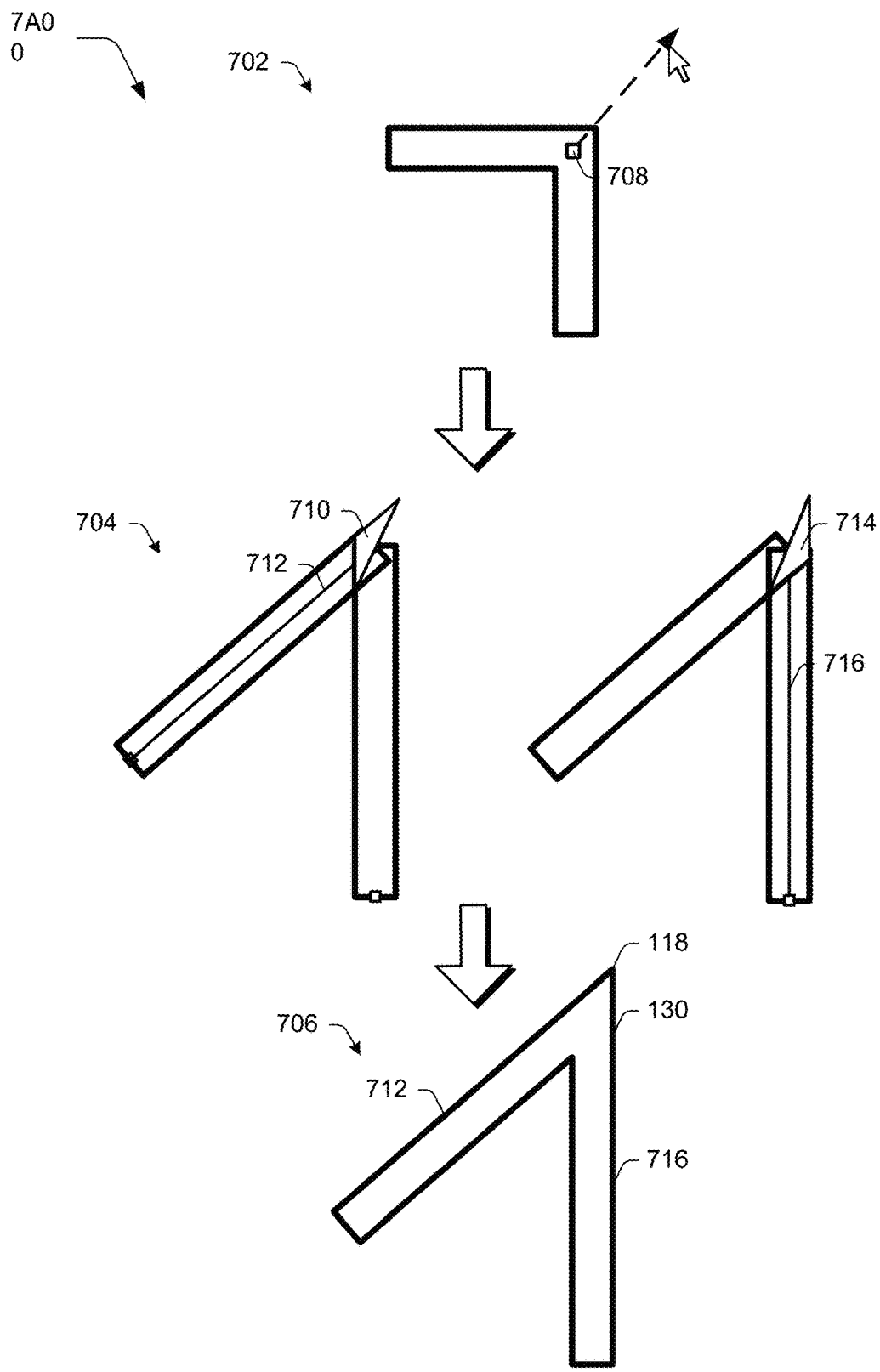
FIG. 7A depicts an example of edit propagation responsive to a change in location of an anchor point.
Figure 7B:
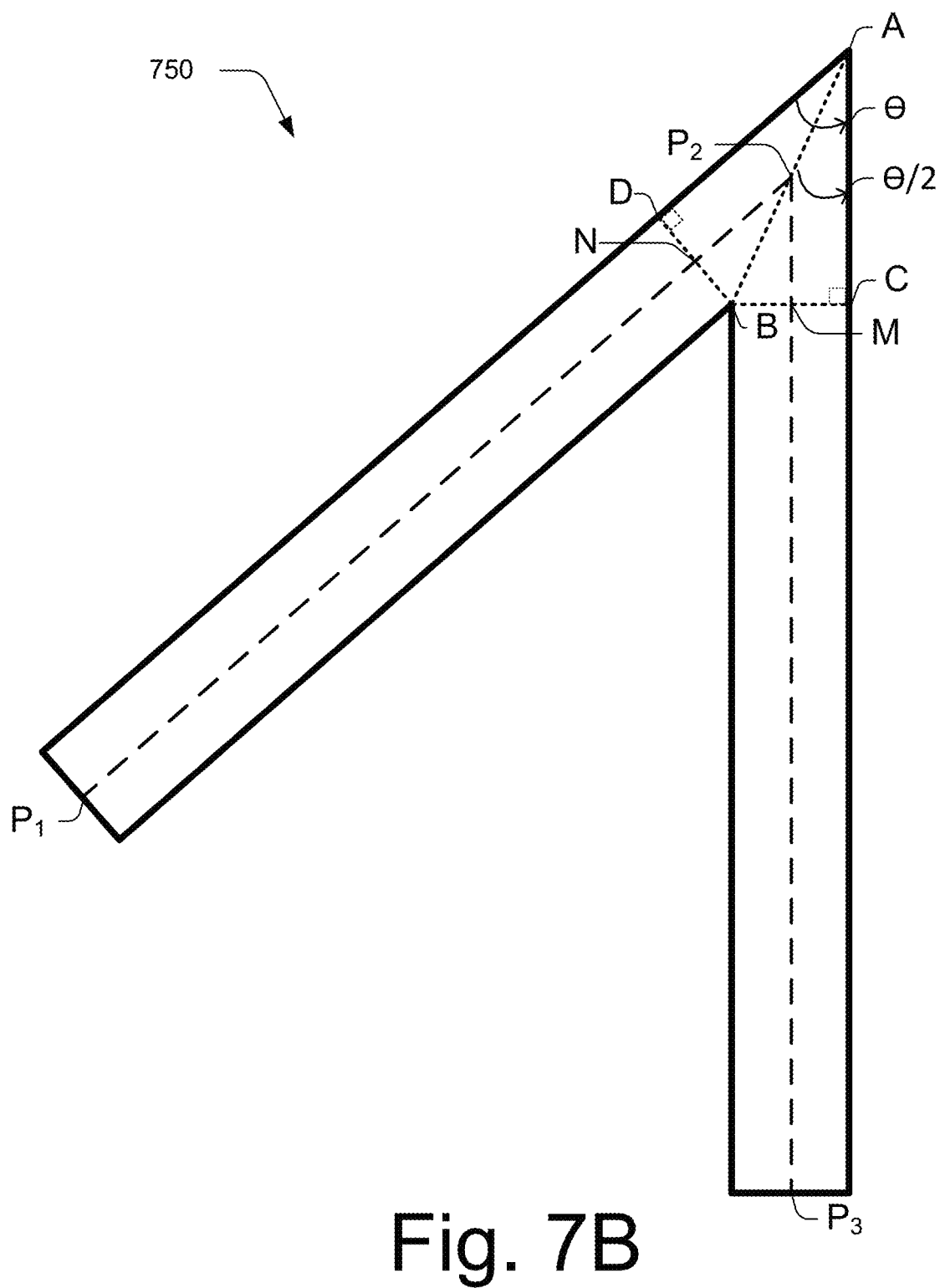
FIG. 7B depicts another example 750 of edit propagation responsive to a change in location of an anchor point.
Figure 8:
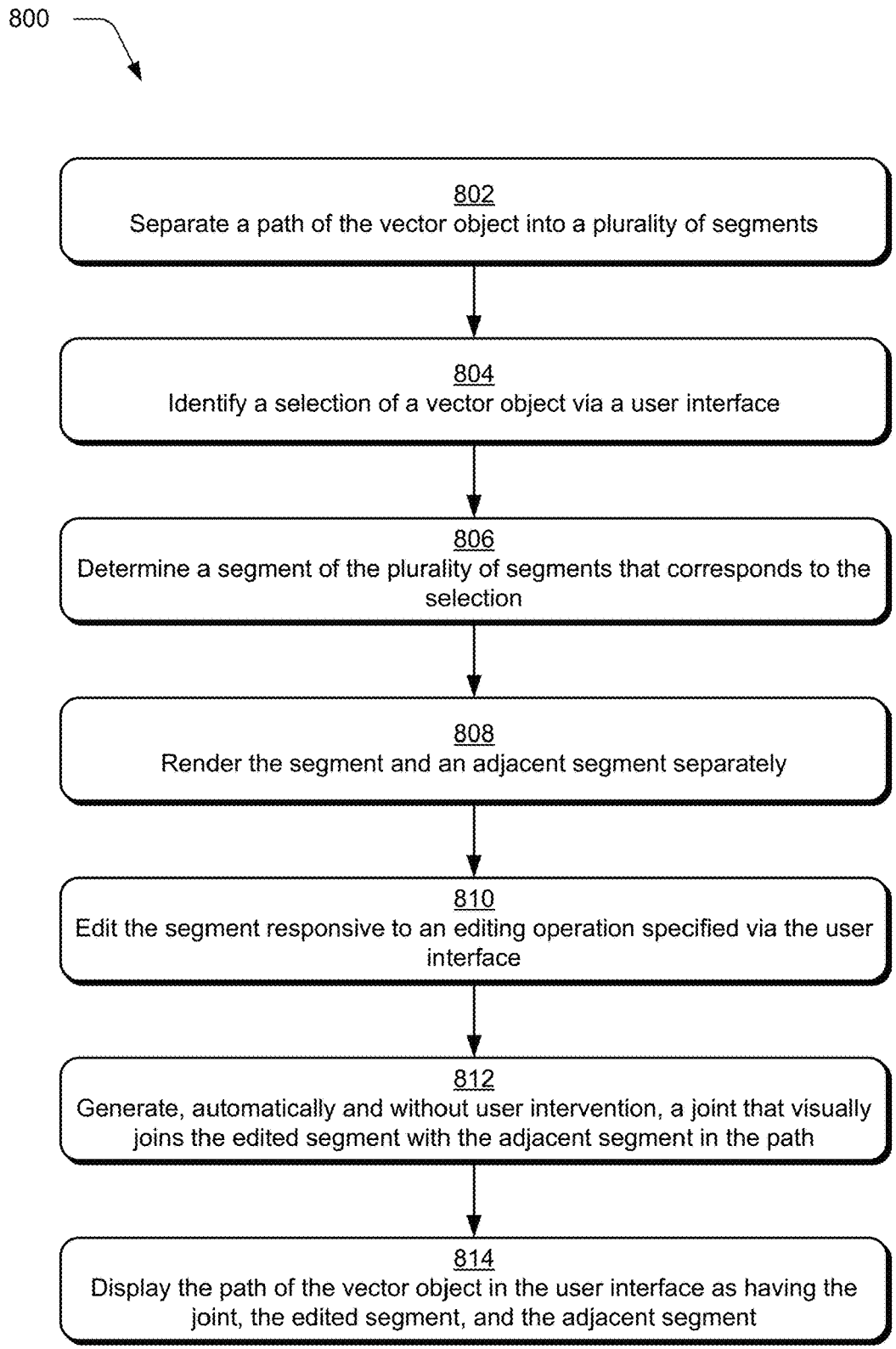
FIG. 8 is a flow diagram depicting a procedure in an example implementation of vector object path segment editing.

FIG. 2 depicts a system 200 in an example implementation showing operation of the vector object editing module 116 of FIG. 1 in greater detail as generating a selected segment model. FIG. 3 depicts a system 300 in an example implementation showing operation of the vector object editing module 116 of FIG. 1 in greater detail as editing a segment and generating a joint of a vector object. FIG. 4 depicts an example 400 of a path of a vector object having a plurality of segments. FIG. 5 depicts an example 500 of separate rendering of the paths of the vector object of FIG. 4. FIG. 6 depicts an example 600 of generation of a joint to visually link the individually rendered segments of FIG. 5. FIG. 7A depicts an example 700 of edit propagation responsive to a change in location of an anchor point. FIG. 7B depicts another example 750 of edit propagation responsive to a change in location of an anchor point. FIG. 8 depicts a procedure 800 in an example implementation of vector object path segment editing.

The following discussion describes techniques that are implementable utilizing the previously described systems and devices. Aspects of each of the procedures are implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-8.

To begin with FIG. 2 in this example, a path 120 of a vector object 118 is separated into a plurality of segments 122 (block 804). This is performable in a variety of ways. Examples of which include responsive to receipt of a user input selecting at least a portion of the vector object 118 via the user interface 110, upon receipt of digital content 106 that includes the vector object 118, and so on. A path segment generation module 202, for instance, is employed to generate a path segment model 204. The path segment generation module 202 include a segment generation module 206 that is configured to identify individual segments 122 within the path 120, e.g., Bezier curves, parametric curves, and so forth.

A segment organization module 208 is then employed to organize the individual segments 122 based on a sequence of the individual segments 122 within the path 120. The segment organization module 208, for instance, selects an initial segment within the path. An endpoint of the initial segment that shares a start point of another segment is then included as "following" the initial segment. This process repeats for each segment within the path 120 to form the path segment model 204 as an ordered list of individual segments 122 as sequentially occurring within the path 120.

A path selection module 210 is then utilized to identify a selection of the vector object 118 via the user interface 110 (block 802) responsive to a user input 212 by a user interface module 216. From this, a segment 214 is determined from the plurality of segments 122 that corresponds to the selection (block 806), i.e., is a "selected segment," using a selection detection module 218. To do so, threshold size 220, closest 222, and distance 224 considerations are taken into account.

The selection detection module 218, for instance, determines a threshold size based on a zoom value for the user interface 110. An initial value of initial_threshold_size at 100% zoom, for instance, is set at four pixels. The threshold size 220 is then determined based on a current zoom value in the user interface 110, e.g., "threshold_size=initial_threshold_size*current_zoom/100."

The selection detection module 218 then finds a point of a plurality of points on the path that is closest to a location of a user input detected via the user interface 110. A distance between the closest point and the location of the user input (e.g., via a cursor control device, gesture, etc.) in the user interface 110 is computed. The selection detection module 218 then ascertains whether the point is within the threshold size of the location, and if so, is indicated as the selected segment 214.

The selected segment 214 is passed to a selection model generation module 226 that is configured to generate a selected segment model 228 from the path segment model 204. To do so, a segment organization module 230 is employed to generate a linked list 232 in which the selected segment 214 is set as a root and child segments 234 are ordered in a hierarchical structure based on arrangement of the segments in relation to the root (i.e., the selected segment 214) in the path segment model 204. The selected segment model 228 is then passed as an input to an editing module 236 to support individual editing of the selected segment 214 as follows.

As depicted in an example 400 of FIG. 4, a selected segment 204 is included as part of a path 120 along with an adjacent segment 404. The selected segment 204 includes a first endpoint 406 and a second endpoint 408 that defines a beginning and end of the selected segment 402. Likewise, the second endpoint 408 defines a beginning of the adjacent segment 404 which terminates at a third endpoint 410. This causes the path 120 to have a visually continuous appearance between segments within the path.

In order to support editing of individual segments within the path 120, an individual path rendering module 302 is first employed by the editing module 236 to render the segment and the adjacent segment separately (block 808) as a rendered selected segment 304 and a rendered adjacent segment 306. This may be performed in a variety of ways, such as to specify separate overlapping endpoints 502, 504 for the selected segment 402 and the adjacent segment 404.

The separately rendered segments are then passed to an edit input module 308 to support editing of the selected segment without editing the adjacent segment. The edit input module 308, for instance, generates an edited segment 310 from the rendered selected segment 304 responsive to receipt of an editing operation 312 specified via the user interface 110 (block 810). A style editing module 314, for instance, is configured to specify a change to a visual property of the rendered selected segment 304, examples of which include width of the segment (e.g., line weight), color of the segment, style of the segment (e.g., dashed, gradients), and so forth. A geometry editing module 316 is also employed to make changes to a geometry of the rendered selected segment 304, e.g., a location of endpoints, curvature, and so forth. In this way, edits are made to the rendered selected segment 304 without editing the rendered adjacent segment 306.

However, this separate rendering as a split path causes formation of a visual gap 506 between the segments as shown in FIG. 5. Accordingly, a joint generation module 318 is utilized to generate, automatically and without user intervention responsive to the editing, a joint 320 that visually joins the edited segment with an adjacent segment in the path (block 812).

FIG. 6 depicts an example 600 of generation of a joint 320 by the selection detection module 218. This example includes, first, second, and third stages 602, 604, 606. At the first stage 602, a first portion 608 of the joint 130 is generated based on the edited segment 402 to at least partially fill the visual gap 506. At the second stage 604, a second portion 610 of the joint 130 is generated based on the adjacent segment 404 to also at least partially fill the visual gap 506. The first and second portions 608, 610, when rendered together, for the joint 130 as shown at the third stage 606 that provides visual continuity between the edited segment 402 and the adjacent segment 404 to appear as a single continuous path.

In instances, in which geometry of the edited segment 402 is specified as part of the editing operation 312, an edit propagation module 322 is employed to propagate the edits back to the individual path rendering module 302 to re-render the rendered selected segment 304 and the rendered adjacent segment 306.

FIG. 7A depicts an example 700 of an editing operation that also includes movement of an anchor point of the edited segment. This example 700 is illustrated using first, second, and third stages 702, 704, 706. As illustrated at the first stage 702, the editing operation specifies movement of an anchor point 708 of the segment. In response, a first portion 710 of the joint 130 is generated based on the edited segment 712 and a second portion 714 of the joint 130 is generated based on the adjacent segment 716. When rendered together as part of the third stage 706, the path 118 of the vector object 118 in the user interface includes the joint 130, the edited segment 712, and the adjacent segment 716 (block 814) having visual continuity.

In another implementation example 750 as depicted in FIG. 7B, as previously described a conventional Bezier path does not permit individual segments to have different styles.

Therefore, as described above the Bezier path is split into multiple segments, which is stored in "PathSegmentsModel" and used to render it in "PathSegmentsViewModel." The "SelectedSegmentsModel" is mapped to a "PathSegmentsViewModel." The following operations are performed using a hit test technique to locate dependent segments (i.e., "child" segments), to which, edits are to be propagated.

First, the "PathSegmentsViewModel" includes options that are used as a basis to map the selected segments, examples of which include segments, handles, and anchor points.

hitOptions={
fill: true,
stroke: true,
segments: true,
tolerance: threshold_size,
handles: true
};

Segments with overlapping anchor points are located using the above option. Successors (i.e., "children") of the segments are traversed to determine whether these segments lie in the same "PathSegmentsModel" as follows:

hits=segments in PathSegmentModel which has overlapping options for all identified segments in hits {
  if(hits[i].type=="segment") {
    itsPath=path in hits
    for all segments in path {
      if(itsPath.segments[j]!=hits[i].segment && itsPath.segments[j].point.getDistance(hits[i].segment.point<2)
      //If it is not the same path as identified before and is within the threshold of 2px, then add it to mappedSegmentsModel
      mappedSegmentsModel.push({type: "segment", hits[i].path,hits[i]); segment: itsPath.segments[j]})
    }
  }
}

Edits are added to the selected segments (e.g., stroke width, color, style) and stored in the "PathSegmentsViewModel" for the "SelectedSegmentsModel." As a result, information is maintained for rendering styles of the segment of the path while maintaining rendering and editability as a Bezier path. As described above, the split path in the "PathSegmentsViewModel" is rendered differently that a single Bezier path containing these segments. Accordingly, a joint 130 is generated to provide this visual continuity.

To begin, endpoints indicating a start and end of the edited segment are located as follows:

start=SelectedSegmentsModel.segment1; // source point of selected_path
end=SelectedSegmentsModel.segment2; // destination point of selected_path Adjacent segments before the before the start and end point are then identified:

If(!end.isLast( ))
endIndex=getIndex(end.point, PathSegmentsModel)
pointAfterEnd=PathSegmentsModel[endIndex+1]
if(!start.isFirst( ))
startIndex=getIndex(start.point, PathSegmentsModel)
pointBeforeStart=PathSegmentsModel[startIndex−1]

For joints before the start and after the end points, values for "pointBerforeStart" and "pointAfterEnd," "start," and "end" are identified. The following rendering techniques are then employed:

if(pointBeforeStart) { start.renderJoint=handleRender(pointBeforeStart, start, end)
pointBeforeStart.next.renderJoint=handleRender(pointBeforeStart, pointBeforeStart.next, end)
}
if(pointAfterEnd) {
start.next.renderJoint=handleRender(start, start.next, pointAfterEnd)
end.renderJoint=handleRender(start, end, pointAfterEnd)
}

For the "handleRender(previous, current, next)" the following is performed to render the identified joints. First, points to be rendered are located based on type of handles, e.g., corner or rounded. With this step, points "P1" and "P3" are located, which are used to render the two portions at the point.

r P1=new Point(previous.point);
var P3=new Point(next.point);
If both previous and next create a curve with the current point {
//Rendering is unaffected
return
}
If one of the points is corner and the other is rounded {/
/If previous point's handle is curved
P1.x=current.handleIn.x+current.point.x
P1.y=current.handleIn.y+current.point.y
//If next point's handle is curved
P3.x=current.handleOut.x+current.point.x
P3.y=current.handleOut.y+current.point.y
}

An angle is calculated that is formed by these points along with a uniform stroke width. Given "$P_1$," "$P_2$," "$P_3$," "stroke_width" is calculated as two vectors:

$$\vec{v_1}=P_1-P_2; \vec{v_3}=P_3-P_2$$

The following angle is then calculated:

$$\theta = \left| \tan^{-1}\left(\frac{v_1-y}{v_1-x}\right) - \tan^{-1}\left(\frac{v_3-y}{v_3-x}\right) \right|$$

Let $$x = \text{Stroke Width} \begin{cases} \text{if } \theta > 180°, \\ \theta = 360° - \theta \end{cases}$$

in which
$\overline{AB}$ is the angle bisector
∴ΔABC≅ΔABD(RHS)
Next, the stroke width is calculated for the joint.
//Get the stroke width to compute the joint rendering
selectedSegmentStrokeWidth=current.path.strokeWidth
// Get the angle made by the two points
vector1=new Point(P1.x—current.point.x, P1.y—current.point.y)
vector1=vector1/P1.getDistance(current.point)
vector3=new Point(P3.x—current.point.x, P3.y—current.point.y)
vector3=vector3/P3.getDistance(current.point)
theta=Math.abs(Math.a tan 2(v1.y, v1.x)—Math.a tan 2(v2.y, v2.x))
if (theta>Math.PI) //Sanitize the angle value
theta=2*Math.P1−theta
theta/=2

//Get the angle bisector
angleBisectorVector=new Point(v1.x+v2.x, v1.y+v2.y)
angleBisectorVector=angleBisectorVector/
angleBisectorVector.getDistance(0,0); // a unit vector along angle bisector Once the angle and stroke width are determined, two sides for rendering the portions of the joint 130 are determined.

Let $\vec{v_0}$ be a vector along $\overline{AB}$ $$\vec{v_0} = \frac{v_1+v_3}{2}$$

$\vec{v_0}$ has its tail at $P_2$ ∵ $\vec{v_1}$ and $\vec{v_3}$ has their tail at $P_2$ let $l = |\overline{AB}| = \dfrac{x}{\sin\dfrac{\theta}{2}}$ For the above, the values "l=(selectedSegmentStrokeWidth/Math.sin(theta))/2" and "h=selectedSegmentStrokeWidth/Math.tan(theta)."

The above values are then used to generate a path having joints that cause the path to appear as a single Bezier path as follows:

$$\text{Similarly } B = \left(\frac{\vec{v_0}}{|\vec{v_0}|} \times \frac{x}{2\sin\dfrac{\theta}{2}}\right) + P_2$$

$$A = \left(-\frac{\vec{v_0}}{|\vec{v_0}|} \times \frac{x}{2\sin\dfrac{\theta}{2}}\right) + P_2$$

$$|\overline{P_2M}| = \frac{AC}{2}$$

$$\tan\frac{\theta}{2} = \frac{x}{AC}$$

So, $AC = \dfrac{x}{\tan\left(\dfrac{\theta}{2}\right)}$

Replacing "AC:"

$$|\overline{P_2M}| = \frac{x}{2\tan\left(\dfrac{\theta}{2}\right)}$$

$$\overline{P_2M} = \frac{\vec{v_3}}{|\vec{v_3}|} \times |\overline{P_2M}|$$

Coordinates of "M:"

$$M = |\overline{P_2M}| + P_2$$

$$\overline{BM} = M - B$$

$$|\overline{BM}| = \frac{x}{2}$$

$$|\overline{BC}| = x$$

$$|\overline{BC}| = 2 \times |\overline{BM}|$$

Coordinates of "C:"

$$C = |\overline{BC}| + B$$

A determination is then made as to whether an anchor point in consideration belongs to a left or right segment as follows:

```
f(p1.path==p2.path) {//Find if anchor point in consideration belongs to left segment or the right segment
    AD=P3+k
    segments=[A, B, c]
} else {
    AD=P1+k
    segments=[A, B, c]
}
k=v*1
A=current.point+k
AD=new Point(A.x–AD.x, A.y–AD.y)
AD=AD/AD.getDistance(0,0)
AD=AD*(1/Math.cos(theta))
c=new Point(AD)
c=c+A
```

For each joint anchor point, three points are calculated that are to be used to create the path for the vector object having the edited segment 324 that is rendered by the rendering module 326. Accordingly, the rendering module 326 creates the path and adds styles that correspond to the segment.

```
jointPath=new Path(segments) // extra path of selected-segment
jointPath.closed=true
jointPath.fillColor=current.path.strokeColor
jointPath.opacity=current.path.opacity
jointPath.strokeWidth=0
```

Edits in "SelectedSegmentsModel" are propagated onto dependent segments in "PathSegmentsModel." Rendering is performed to mimic a single Bezier path. In this step, editability of segments is addressed as if part of a single Bezier path. For this, when an anchor point or Bezier handle is selected for edit in "SelectedSegmentsModel," the dependent segments are identified in the "PathSegmentsModel." In the below code example, anchor points are fetched dependent on the edited anchor points and then the joints are re-rendered for the dependent anchor points.

```
for(var i=0;i<selectedSegmentslength;i++) {
    if(!toBeIgnored.includes(selectedSegments[i]))//if point is not in toBeIgnored
    {
        selectedSegments[i].point+=event.delta;//update point's position
        reRender(selectedSegments[i]);
        if(selectedSegments[i].next)
            reRender(selectedSegments[i].next);
        if(selectedSegments[i].previous)
            reRender(selectedSegments[i].previous);
    }
}
```

The same edits are propagated onto each of the dependent anchor points in the "PathSegmentsModel" and the segments are re-rendered. The below function calls the render joint function for each successor of the given anchor point so that each of the dependent anchor points are rendered in a seamless manner.

```
function reRender(current)
{
    //Find all the hits using the function mentioned in Step 2.
    For all the elements hit
        //Render the joints for the dependent segments
        current.renderJoint.path.segments=[ ];
        previous=current.renderJoint.segments[0];
        next=current.renderJoint.segments[2];
        current.renderJoint=renderjoin(previous, current, next);
    }
}
```

In this way, styling capabilities are provided for segments of a path, while maintaining editability like that of a continuous Bezier path.

Example System and Device

Figure 9:
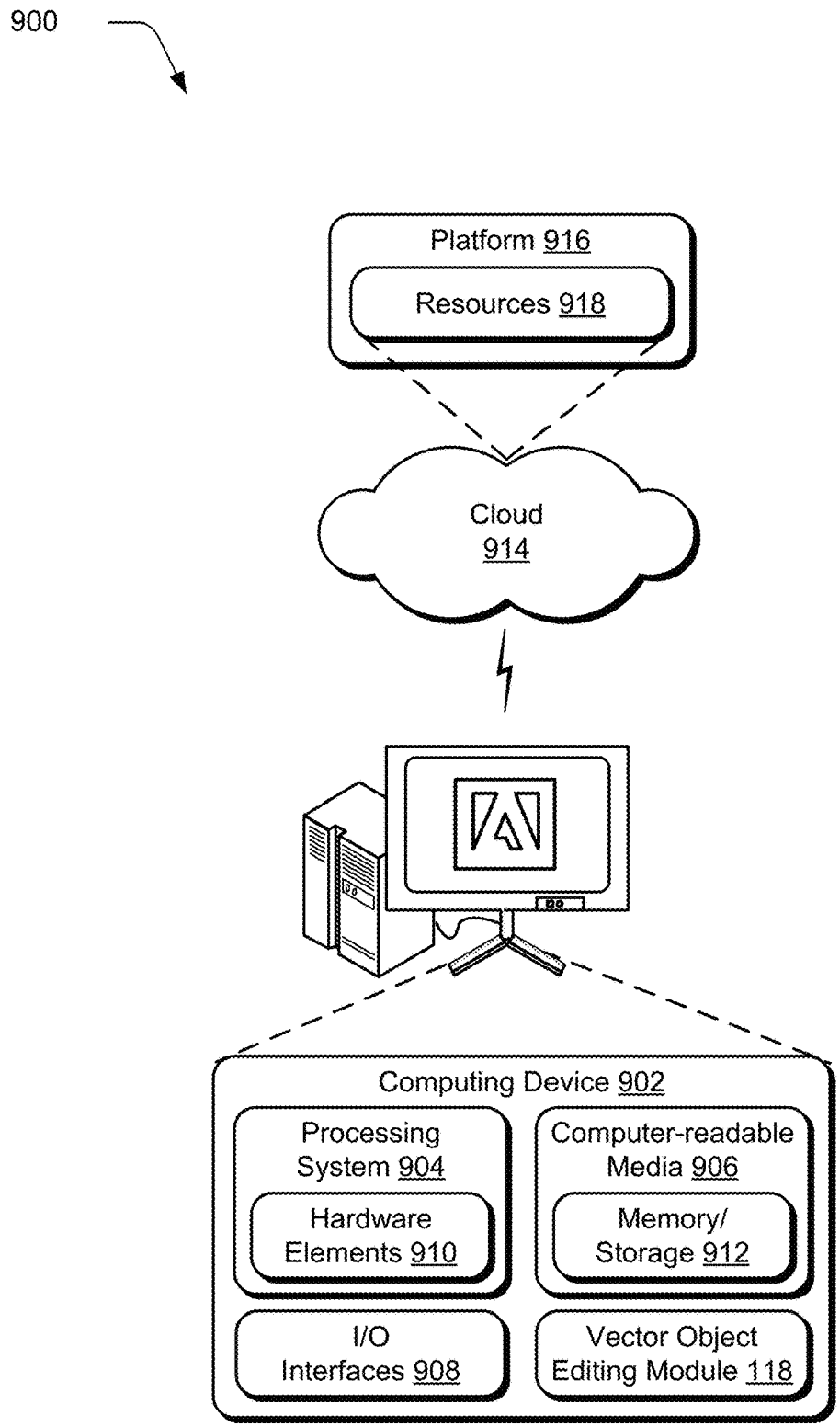
FIG. 9 illustrates an example system including various components of an example device that can be implemented as any type of computing device as described and/or utilize with reference to FIGS. 1-8 to implement embodiments of the techniques described herein.

FIG. 9 illustrates an example system generally at 900 that includes an example computing device 902 that is representative of one or more computing systems and/or devices that implement the various techniques described herein. This is illustrated through inclusion of the vector object editing module 316. The computing device 902 is configurable, for example, as a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. Although not shown, the computing device 902 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware element 910 that is configurable as processors, functional blocks, and so forth. This includes implementation in hardware as an application specific integrated circuit or other logic device formed using one or more semiconductors. The hardware elements 910 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 906 is illustrated as including memory/storage 912. The memory/storage 912 represents memory/storage capacity associated with one or more computer-readable media. The memory/storage 912 includes volatile media (such as random access memory (RAM)) and/or nonvolatile media (such as read only memory (ROM), Flash memory, optical disks, magnetic disks, and so forth). The memory/storage 912 includes fixed media (e.g., RAM, ROM, a fixed hard drive, and so on) as well as removable media (e.g., Flash memory, a removable hard drive, an optical disc, and so forth). The computer-readable media 906 is configurable in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 902. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 902, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 910. The computing device 902 is configured to implement particular instructions and/or functions corresponding to the software and/or hardware modules. Accordingly, implementation of a module that is executable by the computing device 902 as software is achieved at least partially in hardware, e.g., through use of computer-readable storage media and/or hardware elements 910 of the processing system 904. The instructions and/or functions are executable/operable by one or more articles of manufacture (for example, one or more computing devices 902 and/or processing systems 904) to implement techniques, modules, and examples described herein.

The techniques described herein are supported by various configurations of the computing device 902 and are not limited to the specific examples of the techniques described herein. This functionality is also implementable all or in part through use of a distributed system, such as over a "cloud" 914 via a platform 916 as described below.

The cloud 914 includes and/or is representative of a platform 916 for resources 918. The platform 916 abstracts underlying functionality of hardware (e.g., servers) and software resources of the cloud 914. The resources 918 include applications and/or data that can be utilized while computer processing is executed on servers that are remote from the computing device 902. Resources 918 can also include services provided over the Internet and/or through a subscriber network, such as a cellular or Wi-Fi network.

The platform 916 abstracts resources and functions to connect the computing device 902 with other computing devices. The platform 916 also serves to abstract scaling of resources to provide a corresponding level of scale to encountered demand for the resources 918 that are implemented via the platform 916. Accordingly, in an interconnected device embodiment, implementation of functionality described herein is distributable throughout the system 900. For example, the functionality is implementable in part on the computing device 902 as well as via the platform 916 that abstracts the functionality of the cloud 914.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a computing device, the method comprising:

identifying, by the computing device, a selection of a vector object via a user interface;

separating, by the computing device, a path of the vector object into a plurality of segments including a segment and an adjacent segment having overlapping anchor points defining the segment and the adjacent segment that form a visual gap when rendered as a result of the separating;

editing, by the computing device, the segment responsive to an editing operation specified via the user interface;

generating, automatically and without user intervention by the computing device responsive to the editing, a joint that visually joins the edited segment with the adjacent segment in the path; and rendering, by the computing device, the path of the vector object in the user interface as having the joint that at least partially fills the visual gap, the edited segment, and the adjacent segment.

2. The method as described in claim 1, wherein the plurality of segments are Bezier curves.

3. The method as described in claim 2, wherein an anchor point of a respective said Bezier curve of the edited segment overlaps an anchor point of a respective said Bezier curve of the adjacent segment.

4. The method as described in claim 1, wherein the rendering of the joint overlaps an anchor point of the edited segment and an anchor point of the adjacent segment.

5. The method as described in claim 1, wherein the joint includes a first portion based on the edited segment and a second portion based on the adjacent segment.

6. The method as described in claim 1, further comprising rendering the segment as a Bezier curve separately from a Bezier curve representing the adjacent segment.

7. The method as described in claim 6, wherein the rendering includes replacing a shared anchor point shared by the segment and the adjacent segment with a first anchor point for the segment that overlaps and is separate from a second anchor point for the adjacent segment.

8. The method as described in claim 6, wherein:
the rendering causes formation of the visual gap between the edited segment and the adjacent segment; and
the joint at least partially overlaps the visual gap and provides visual continuity between the edited segment and the adjacent segment within the path.

9. The method as described in claim 1, further comprising locating the adjacent segment based on a model that describes a sequence of the plurality of segments, one to another, within the path.

10. The method as described in claim 1, wherein the editing operation involves a change in location of the identified segment and further comprising propagating the change in location to the adjacent segment.

11. The method as described in claim 1, wherein:
the editing operation specifies a change in a display characteristic to the segment; and
the editing is performed to change the display characteristic of the segment and a display characteristic of the adjacent segment is unedited as specified by the vector object.

12. The method as described in claim 1, wherein further comprising determining the segment from the plurality of segments includes:
calculating a threshold size based on a zoom value;
finding a point of a plurality of points on the path that is closest to a location of a user input detected via the user interface indicating the selection;
ascertaining whether the point is within the threshold size of the location; and
responsive to the ascertaining the point is within the threshold size, setting the segment as corresponding to the selection.

13. A system comprising:
a path segment generation module implemented at least partially in hardware of a computing device to separate a path of a vector object having a visual property into a plurality of segments that include a segment and an adjacent segment that share the visual property;
an edit input module implemented at least partially in hardware of the computing device to edit the visual property of the segment responsive to an editing operation received;
a joint generation module implemented at least partially in hardware of the computing device to generate, automatically and without user intervention, a joint that visually joins the edited segment with the adjacent segment, the joint including a first portion that includes the edit to the visual property based on the segment and a second portion based on the visual property of the adjacent segment; and
a rendering module implemented at least partially in hardware of the computing device to render the path of the vector object as having the joint, the edited segment, and the adjacent segment.

14. The system as described in claim 13, wherein:
the plurality of segments are Bezier curves, and
an anchor point of a respective said Bezier curve of the edited segment overlaps an anchor point of a respective said Bezier curve of the adjacent segment.

15. The system as described in claim 13, wherein the visual property includes width, color, or style.

16. The system as described in claim 13, wherein the edited segment rendered separately from the adjacent segment in the path causes formation of a visual gap and the joint at least partially overlaps the gap and provides visual continuity between the edited segment and the adjacent segment within the path.

17. The system as described in claim 13, wherein:
the editing operation specifies a change in the visual property to the segment; and
the editing is performed to change the visual property of the segment and the visual property of the adjacent segment is unedited as specified by the vector object.

18. A system comprising:
means for separating a path of a vector object into a plurality of segments;
means for editing the segment responsive to an editing operation;
means for locating an adjacent segment of the plurality of segments that is adjacent to the edited segment;
means for generating, automatically and without user intervention, a joint that includes a first portion based on the edited segment and a second portion based on the adjacent segment, the joint at least partially overlapping the edited segment and the adjacent segment; and
means for displaying the path of the vector object in a user interface as having the joint, the edited segment, and the adjacent segment.

19. The system as described in claim 18, further comprising means for rendering the segment and the adjacent segment separately in the user interface.

20. The system as described in claim 18, wherein:
the plurality of segments are Bezier curves, and an anchor point of a respective said Bezier curve of the edited segment overlaps an anchor point of a respective said Bezier curve of the adjacent segment.

\* \* \* \* \*